US008060874B2

(12) United States Patent
Rengarajan et al.

(10) Patent No.: US 8,060,874 B2
(45) Date of Patent: Nov. 15, 2011

(54) EFFICIENT PROVISIONING OF SOFTWARE PACKAGES TO MOBILE HANDHELD DEVICES

(75) Inventors: Varadachari Rengarajan, Cupertino, CA (US); Janakiraman Goplan, Cupertino, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1265 days.

(21) Appl. No.: 11/668,152

(22) Filed: Jan. 29, 2007

(65) Prior Publication Data

US 2008/0184221 A1 Jul. 31, 2008

(51) Int. Cl.
*G06F 9/44* (2006.01)
(52) U.S. Cl. ......... 717/177; 717/168; 717/171; 717/172
(58) Field of Classification Search ..................... None
See application file for complete search history.

(56) References Cited

U.S. PATENT DOCUMENTS

| | | | | |
|---|---|---|---|---|
| 5,659,544 | A | * | 8/1997 | La Porta et al. ............... 370/312 |
| 6,427,174 | B1 | | 7/2002 | Sitaraman et al. |
| 6,487,407 | B2 | * | 11/2002 | Goldberg et al. ............. 455/433 |
| 6,944,447 | B2 | * | 9/2005 | Portman et al. ............ 455/422.1 |
| 6,980,812 | B1 | | 12/2005 | Sandhu et al. |
| 7,461,373 | B2 | * | 12/2008 | Herle et al. .................... 717/171 |
| 7,515,573 | B2 | * | 4/2009 | Bajic ............................. 370/338 |
| 2001/0044309 | A1 | * | 11/2001 | Bar et al. ....................... 455/456 |
| 2003/0114149 | A1 | | 6/2003 | Lehtonen et al. |
| 2004/0003266 | A1 | * | 1/2004 | Moshir et al. ................. 713/191 |
| 2004/0203900 | A1 | * | 10/2004 | Cedervall et al. .......... 455/456.1 |
| 2005/0066044 | A1 | * | 3/2005 | Chaskar et al. ............... 709/230 |
| 2005/0128074 | A1 | * | 6/2005 | Culpepper et al. ......... 340/539.1 |
| 2005/0289534 | A1 | * | 12/2005 | Kim et al. ..................... 717/172 |
| 2006/0187896 | A1 | * | 8/2006 | Jung ............................. 370/349 |
| 2006/0234623 | A1 | * | 10/2006 | Wallis et al. ................. 455/3.01 |
| 2007/0049297 | A1 | * | 3/2007 | Gopalan et al. ............ 455/456.5 |
| 2007/0055970 | A1 | * | 3/2007 | Sakuda et al. ................ 717/168 |
| 2007/0147298 | A1 | * | 6/2007 | Miao et al. .................... 370/331 |

FOREIGN PATENT DOCUMENTS

| | | |
|---|---|---|
| WO | 2005006802 | 1/2005 |
| WO | 2007027438 | 3/2007 |

OTHER PUBLICATIONS

Ihn-Han Bae et al.: A Fuzzy Logic-based Location Management Method for Mobile Networks, [online], 2004, pp. 1-16, [retrived on Jul. 29, 2011], retrived from the Internet: <URL: http://mmlab.cu.ac.kr/paper03/Bae_paper(Incs).pdf>.*

(Continued)

*Primary Examiner* — Thuy Dao
*Assistant Examiner* — Ziaul A Chowdhury

(57) ABSTRACT

Methods and system are provided for delivering a software package to particular wireless computing devices (WCDs). The system includes logical sites (LSs), WCDs, and a Network Operation Center (NOC) communicatively coupled to the LSs by a network. The NOC includes a device management module (DMM) and a second DCP server. The DMM is designed to: determine that particular ones of the WCDs are currently located at and associated with a first LS based on registration information for each of the WCDs; determine characteristics of the particular ones of the WCDs currently located at and associated with the first LS; and determine particular software packages appropriate for the particular ones of the WCDs based on the characteristics of the particular ones of the WCDs currently located at the first LS. The second DCP server designed to send the particular software packages to the first DCP server.

22 Claims, 5 Drawing Sheets

OTHER PUBLICATIONS

Ian F. Akyildiz et al: Mobility Management in Next-Generation Wireless Systems, [online], 1999, pp. 1347-1384, [retrieved on Jul. 29, 2011], retrived from the Internet: <URL:http://citeseerx.ist.psu.edu/viewdoc/download?doi=10.1.1.15.3014&rep=rep1&type=pdf>.*

Krishna M.Sivalingam et al.: Design and analysis of low-power access protocols for wireless and mobile ATM networks, [online], 2000, pp. 73-87, [retrieved on Aug. 1, 2011], retreved from the Internet: <URL:http://citeseerx.ist.psu.edu/viewdoc/download-?doi=10.1.1.88.3413&rep=rep1&type=pdf>.*

Liping Wang et al.: Performance Analysis of Fast Handover Schemes in IEEE 802.16e Broadband Wireless Networks, [online], 2007,pp. 1-4, [retrieved on Jul. 29, 2011], retrieved from the Internet: <URL:http://www.apan.net/meetings/xian2007/publication/091_Liping.pdf>.*

David Moore et al.: Robust Distributed Network Localization with Noisy Range Measurements, [Online]. 2004, pp. 50-61, [retrived on Jul. 29, 2011], retrived from the Internet: <URL:http://delivery.acm.org/10.1145/1040000/1031502/p50-moore.pdf>.*

PCT/US2006/032089 International Search Report mailed Jan. 25, 2007 relating to U.S. Appl. No. 11/668,152.

PCT/US2004/020800 International Serach Report mailed Aug. 12, 2004 relating to U.S. Appl. No. 11/668,152.

* cited by examiner

Site Table

| Name |
| WAN Address |
| WLAN Address |
| Port |
| Relative Directory |
| User Identifier |
| Password |
| Passive Mode |
| TFTP or FTP |

FIG. 3

Provisioning Package Table

| Name |
| Version |
| Type |
| Description |
| Applicable OS Types |
| Applicable CPU Types |
| Applicable Device Models |

FIG. 5

Device Table

| IP Address |
| Model |
| Unit Identifier |
| CPU Type |
| Firmware Version |
| OS |
| OS Version |
| Device Agent Version |
| MAC Address |
| Assigned Site |
| Current Site |

FIG. 2

Software Inventory Table

| Application Name |
| Application Path |
| Application Type |
| Application Version |
| Application Information |

FIG. 4

EFFICIENT PROVISIONING OF SOFTWARE PACKAGES TO MOBILE HANDHELD DEVICES

FIELD OF THE INVENTION

The present invention generally relates to providing software to handheld devices, and more particularly relates to providing software packages to mobile handheld devices capable of roaming between different physical sites and/or logical sites of an enterprise network.

BACKGROUND OF THE INVENTION

An enterprise network typically includes a Network Operations Center (NOC) that is responsible for managing a large number of wireless and wired devices which can be distributed throughout one or more physical sites which make up the enterprise network. Each physical site includes one or more logical sites, and in many cases, a NOC may be responsible for managing thousands of wireless computing devices which can be distributed among the various physical and/or logical sites that make up the enterprise network (e.g., in retail environment).

When these wireless computing devices have to be provisioned or updated with software, configuration or firmware, the wireless computing devices pull data from the NOC. As the number of wireless computing devices increases, this approach creates a large load on the network. This approach is inefficient since the NOC will often send multiple copies of same software package to the same site if there are multiple wireless computing devices of the same type at that site.

In some enterprise networks, many of the wireless computing devices are handheld mobile devices which move or "roam" between different physical and/or logical sites within the enterprise network. When a particular wireless computing device moves or roams between different physical and/or logical sites the NOC will try to provision the wireless computing device using its original Direct Connection Protocol (DCP) server at the site the device was initially assigned to. However, because the particular wireless computing device has roamed, the particular wireless computing device will no longer have a connection to its original DCP server due to network routing configuration restrictions and hence would remain unprovisioned. In some cases, software packages for a particular wireless computing device will not be available at the current site the particular wireless computing device has roamed to.

As the number of wireless computing devices increases the task on updating software running on each of the wireless computing devices becomes a complex task. In many cases, wireless computing devices that have moved from one physical and/or logical site to another physical and/or logical site will end up running old versions of software even though a newer version of the software is available for the wireless computing devices. This causes device management problems for a network administrator.

Accordingly, it is desirable to provide improved techniques for updating software running on potentially mobile devices in an enterprise network that includes a number of logical sites. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A system is provided for delivering at least one available software package to particular wireless computing devices. The system comprises a plurality of logical sites, a plurality of wireless computing devices, and a Network Operation Center (NOC) communicatively coupled to the plurality of logical sites by a network. The plurality of logical sites comprise a first logical site which comprises a first DCP server. The NOC comprises a device management module (DMM) and a second DCP server. The DMM is designed to: receive a particular software package; receive registration information from each of the wireless computing devices in the system, wherein the registration information for each of the wireless computing devices comprises: information identifying each of the wireless computing devices, and information identifying the logical site at which each of the wireless computing devices are currently located; determine first ones of the wireless computing devices that have registered to receive the particular software package; track a current location of the wireless computing devices; determine particular ones of the logical sites the first ones of the wireless computing devices are currently located at and associated with; determine that the particular ones of the first ones of the wireless computing devices are currently located at and associated with the first logical site based on registration information for each of the first ones of the wireless computing devices; determine characteristics of the particular ones of the first ones of the wireless computing devices currently located at and associated with the first logical site before sending any software packages to the first logical site; and determine particular software packages appropriate for the particular ones of the first ones of the wireless computing devices based on the characteristics of the particular ones of the first ones of the wireless computing devices currently located at and associated with the first logical site. The second DCP server designed to send the particular software packages to the first DCP server.

A method is provided for delivering at least one available software package to particular ones of a plurality of wireless computing devices located at a first logical site. The method comprises receiving a particular software package; receiving registration information from each of the wireless computing devices in the system, wherein the registration information for each of the wireless computing devices comprises: information identifying each of the wireless computing devices, and information identifying the logical site at which each of the wireless computing devices are currently located; determining first ones of the wireless computing devices that have registered to receive the particular software package; tracking a current location of the wireless computing devices; determining particular ones of the logical sites the first ones of the wireless computing devices are currently located at and associated with; determining that the particular ones of the first ones of the wireless computing devices are currently located at and associated with the first logical site based on registration information for each of the first ones of the wireless computing devices; determining characteristics of the particular ones of the first ones of the wireless computing devices currently located at and associated with the first logical site before sending any software packages to the first logical site; determining particular software packages appropriate for the particular ones of the first ones of the wireless computing devices based on the characteristics of the particular ones of the first ones of the wireless computing devices currently located at and associated with the first logical site; and sending the particular software packages to a first DCP server located at the first logical site.

BRIEF DESCRIPTION OF THE DRAWINGS

The present invention will hereinafter be described in conjunction with the following drawing figures, wherein like numerals denote like elements.

FIG. 2 is an exemplary device or "managed entity" table maintained in the DMM database;

FIG. 3 is an exemplary site table maintained in the DMM database;

FIG. 4 is an exemplary software inventory table maintained in the DMM database;

FIG. 5 is an exemplary provisioning package table maintained in the DMM database;

DETAILED DESCRIPTION OF THE INVENTION

Figure 1:
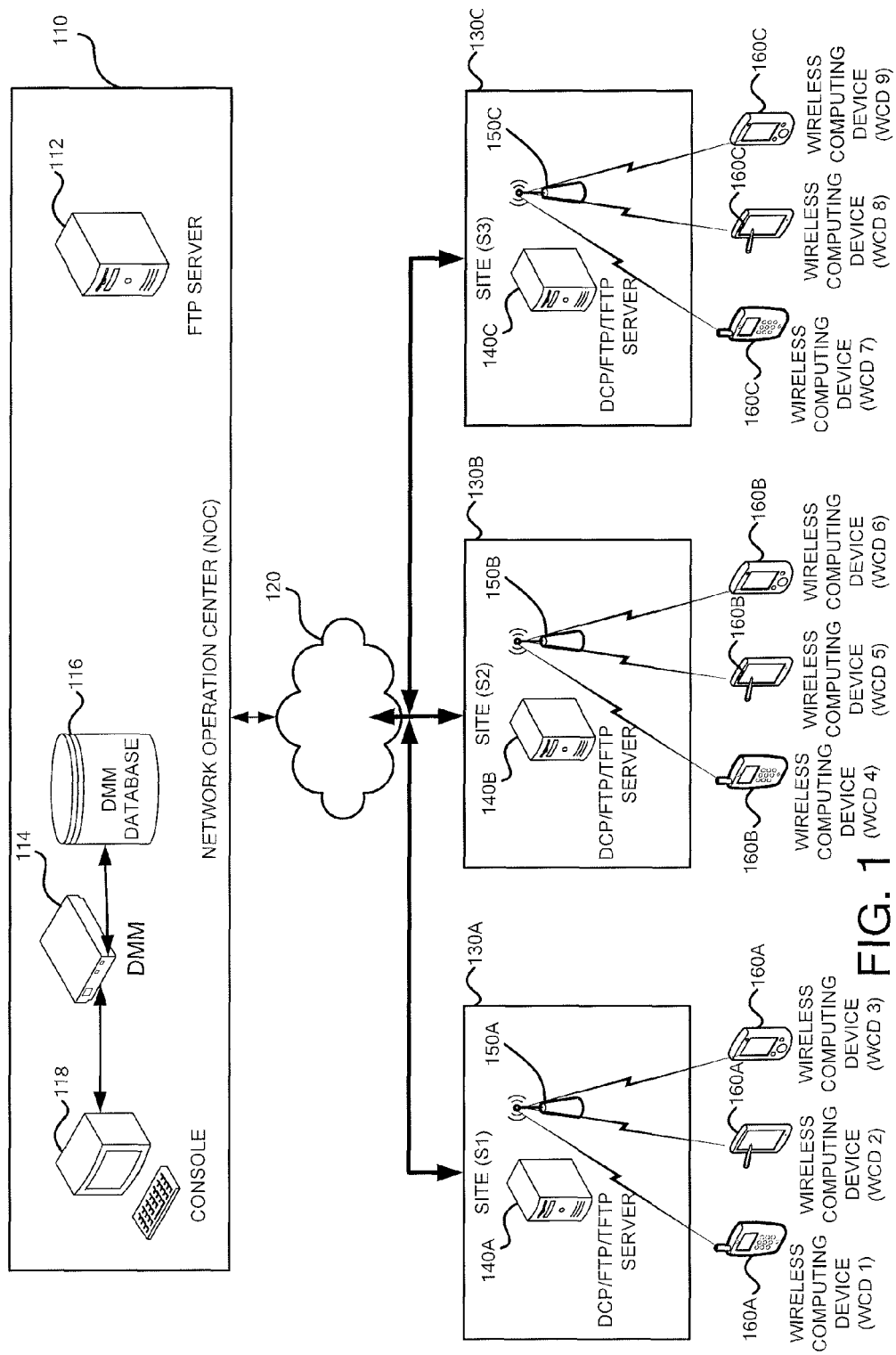
FIG. 1 is a block diagram illustrating an exemplary enterprise communication network at a first time.

The following detailed description of the invention is merely exemplary in nature and is not intended to limit the invention or the application and uses of the invention. Furthermore, there is no intention to be bound by any theory presented in the preceding background of the invention or the following detailed description of the invention.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As used herein, the term "Direct Connection Protocol (DCP) server" refers to a server which runs DCP server software and operates according to a Direct Connection Protocol (DCP).

A DCP refers to a protocol by which DCP client establishes a "direct connection" with the DCP server to perform its operations or "tasks." A DCP server implements the server side of the DCP protocol and a DCP client implements the client side of the DCP protocol. Examples of tasks include, but are not limited to, uploading a file to a DCP server, or downloading a file from DCP server. A DCP can refer to any direct communication connection protocol which is not blocked by a firewall between the sending programs or terminals and the receiving programs or terminals. Examples of DCPs include, but are not limited to, the File Transfer Protocol (FTP), the Trivial File Transfer Protocol, hypertext transfer protocol (HTTP) and secure file transfer protocols such as secure hypertext transfer protocol (HTTPs) and File Transfer Protocol Secure (FTPS) both using secure socket layer (SSL), and Secure Copy Protocol (SCP) and Secure File Transfer Protocol (SFTP) both using secure shell (SSH).

As used herein, the term "File Transfer Protocol (FTP) server" refers to a server which runs FTP server software and operates according to an open standard known as the file transfer protocol (FTP) used to connect two computers over a network (e.g., the Internet or an intranet) so that the user of one computer can transfer files and perform file commands on the other computer. Specifically, FTP is a commonly used protocol for exchanging files over any network that supports the TCP/IP protocol. There are two computers involved in an FTP transfer: a server and a client. The FTP server listens on the network for connection requests from other computers. The client computer, running FTP client software, initiates a connection to the server. Once connected, the client can do a number of file manipulation operations such as uploading files to the server, download files from the server, rename or delete files on the server and so on. This allows any computer connected to a TCP/IP based network to manipulate files on another computer on that network regardless of which operating systems are involved (if the computers permit FTP access). There are many existing FTP client and server programs.

As used herein, the term "Trivial File Transfer Protocol (TFTP) server" refers to a very simple file transfer protocol with the functionality of a very basic form of FTP. TFTP is easy to implement in a very small amount of memory, and can be used to transfer small files between hosts on a network.

As used herein, the term "wireless computing device" refers to any computer designed to communicate with an infrastructure device over an air interface. In many cases such wireless computing devices are "handheld" and potentially mobile or "nomadic." Examples of mobile devices can include, but are not limited to, personal computers, hand-held or laptop devices, tablet Personal Computers (PCs), Point of Sale (POS) devices, personal digital assistants (PDAs), mobile printers, kiosk-based computers, retail product information systems and network PCs.

As used herein, the term "provisioning" refers to the process of requesting, obtaining, deploying and/or configuring software on a wireless computing device.

As used herein, the term "software package" refers to a collection of one or more files that are used for the execution of an application. The files can include, but are not limited to, application executables, configuration files, install scripts, help files, operating systems, etc. Depending on the implementation, the software package can be a zipped file, a compressed file or uncompressed file.

As used herein, the term "site" can refer to either a logical site or a physical site. As used herein, the term "physical site" refers to location such as a store or a warehouse. In many network configurations, a physical site may be configured with multiple logical sites. As used herein, the term "logical site" refers to a logical collection of a DCP server, FTP server or TFTP server, infrastructure devices such as wireless switches, access points/ports, and mobile device(s). In some network configurations, a logical site may encompass multiple physical sites.

FIG. 1 is a block diagram illustrating an exemplary enterprise communication network 100 at a first time. The network 100 comprises a Network Operations Center (NOC) 110 communicatively coupled to a plurality of logical sites 130A-C by a network 120. The network 120 may comprise, for example, the Internet or an intranet. The network 100 also includes a plurality of wireless computing devices (WCDs 1-9) 160A-C. The wireless computing devices may comprise, for example, personal computers, hand-held or laptop devices, personal digital assistants, kiosk-based computers, retail product information systems, network PCs, and the like. Each of the wireless computing devices includes a DMM device agent (not shown) that runs on the wireless computing device. It will be appreciated by those skilled in the art that although FIG. 1 shows an exemplary network configuration which includes nine wireless computing devices 160A-C, in many actual enterprise networks hundreds or thousands of wireless computing devices are configured as part of the network.

Each of the logical sites 130A-C comprise a DCP server 140 and at least one infrastructure device 150 for communicating with wireless computing devices located at and associated with that logical site. It will be appreciated by those skilled in the art that although FIG. 1 shows an exemplary network configuration which includes three logical sites 130A-C, in many actual enterprise networks tens or hundreds or even thousands of logical sites are configured as part of the network.

The DCP servers 140A-C each perform a number of different functions depending on the particular implementation. For example, some of the functions performed by a DCP server include, but are not limited to, managing directories, folders and files at the logical site, and managing DCP client connections (e.g., set options for DCP client connection). This can include, for example, managing directories on the DCP server (e.g., create a new directory on the DCP server or removing an existing directory on the DCP server), changing directories or directory structures (e.g., change the current directory to the parent directory on the DCP server, or change the current directory on the DCP server), allocating space for a file to be uploaded to the DCP server, setting or implementing security policies with respect to files it stores (e.g., set permissions on a file located on the DCP server), deleting files, downloading or uploading files (e.g., download a file from the DCP server or upload a file onto the DCP server), providing lists of the files in a specified directory on the DCP server, renaming files, returning the size of a specified file, returning a current folder name, etc. Other functions of the DCP servers will be described below.

The infrastructure devices 150A-C may comprise wireless communication devices, such as, a wireless access point or a combination of a wireless switch and a wireless access port. For example, an infrastructure device 150 may be a wireless access point that complies with the IEEE 802.11 Standard or other wireless local area network (WLAN) Standards, a Bluetooth access point, or the like. The infrastructure device 150 and the wireless computing devices associated with that logical site may communicate with each other in accordance with any known communication standards such as those based on IEEE 802.11 (e.g., 802.11a, 802.11b, 802.11g, 802.11e, 802.11n or 802.11s) or 802.16 standards, Bluetooth, or any other packetized communication standard or packet data protocols such as TDMA (time division multiple access), GPRS (General Packet Radio Service) and EGPRS (Enhanced GPRS). As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.

The NOC 110 comprises a FTP server 112, a device management module (DMM) 114, a DMM database 116, and a console 118.

The DMM 114 comprises a number of sub-modules (not shown), such as, a provisioning sub-module, a job manager sub-module, a Direct Connection Protocol (DCP) manager sub-module, and a Device Element Manager sub-module.

The provisioning sub-module handles provisioning of different types of payloads to wireless computing devices. The different types of payloads include, for example, firmware, software packages, etc. The provisioning sub-module also communicates with DCP server and transfers the payload. The provisioning sub-module also tracks the progress of the payload transfer. For each payload transfer to the DCP server the provisioning sub-module maintains the following: transfer status, transfer start time, transfer end time, percentage complete, and detailed provisioning status. The detailed provisioning status includes the time at which the device picked up the package and what step it is in performing the software update operation. The provisioning sub-module manages connection timeouts, retries, cancel transfer, etc.

A job is a task to be performed on the wireless computing device. The job manager sub-module exposes an interface to: create different types of jobs, such as, configuration, command, provisioning for a single device or a group of devices; schedule the job; track the job progress; cancel the job; and/or search for jobs by device type.

The Direct Connection Protocol (DCP) manager sub-module acts a DCP client, and runs the protocol that allows it to communicate with the DCP server to exchange data.

The Device Element Manager sub-module(s) are processes that allow an administrator to configure and manage wireless computing devices. The Device Element Manager sub-module managing a particular wireless computing device or devices runs protocols that allow it to communicate with the particular wireless computing device(s) and all the different messages the particular wireless computing device(s) can accept. The Device Element Manager sub-module acts as a proxy for higher level management applications.

The DMM 114 receives registration information from each of the wireless computing devices 160A-160C in the network 100, and provides this registration information to the DMM database 116 where it is stored for later use. The registration information for each of the wireless computing devices comprises: information identifying the wireless computing device, information identifying the logical site and/or physical site at which the wireless computing device is currently located, software characteristics associated with the wireless computing device, and hardware characteristics associated with the wireless computing device. The software characteristics associated with the wireless computing device may comprise, for example, the operating system of the wireless computing device, operating system version number, and software packages the wireless computing device wants to receive updates for and the version number of those software packages. The hardware characteristics associated with the wireless computing device may comprise, for example, device name, device type, device model number, device unit identifier, and device CPU type.

The DMM database 116 of the network operations center (NOC) is designed to store management information including, for example, characteristics associated with each of the wireless computing devices on a per logical site basis, and characteristics associated with each logical site. Examples of this management information are shown in FIGS. 2 and 3. The DMM database 116 also keeps track of information or metadata regarding each of the available software packages. For instance, in one embodiment, the metadata comprises: a software package identifier, information regarding operating systems supported by the software package, and information regarding hardware supported by the software package. An exemplary software package identifier comprises, for example, name of the software package, major version number of the software package, minor version number of the software package. Exemplary information regarding operating systems supported by the software package comprises names of operating system platforms supported by the software package, and operating system platform versions supported by the software package. Exemplary information regarding hardware supported by the software package comprises CPU types supported by the software package, device models supported by the software package, and device types supported by the software package. Examples of information or metadata regarding each of the available software packages are shown in FIGS. 4 and 5.

FIG. 2 is an exemplary device or "managed entity" table 200 maintained in the DMM database 116. The device table 200 is used to keep track of information about characteristics associated with each of the wireless computing devices. In this exemplary embodiment, the device table 200 comprises an IP address field, a device model field, a unit identifier field, a CPU type field, a firmware version field, an operating system (OS) field, an OS version field, a device agent version field, a MAC address field, an assigned site field, and a current site field.

FIG. 3 is an exemplary site table 300 maintained in the DMM database 116. The site table 300 is used to keep track of information about characteristics associated with each logical site. In this exemplary embodiment, the site table 300 comprises a name field, a wide area network (WAN) address field, a Wireless Local Area Network (WLAN) address field, a port field, a relative directory field, a user identifier field, a password field, a passive mode field, and a TFTP or FTP field.

The information regarding each available software package comprises a variety of metadata as shown in FIGS. 4-5. FIG. 4 is an exemplary software inventory table 400 maintained in the DMM database 116. The software inventory table 400 is used to keep track of information regarding each available software package. In this exemplary embodiment, the software inventory table 400 comprises an application name field, an application path field, an application type field, an application version field, and an application information field. FIG. 5 is an exemplary provisioning package table 500 maintained in the DMM database 116. The provisioning package table 500 is used to keep track of other information regarding each available software package, such as the application name, version number, type, description, all the OS types and device models on which the application can run. In this exemplary embodiment, the provisioning package table 500 comprises a name field, a version field, a type field, a description field, an applicable OS type(s) field, applicable CPU type(s) and applicable device models field.

Among other functions, the DMM 114 operates to track the current location of the wireless computing devices 160A-C that are registered with the DMM 114 and associated with one of the sites 130A-C, and to provision software packages to wireless computing devices 160A-C. The device management module (DMM) 114 is configured to perform a number of functions some of which will be described below with reference to FIG. 7.

Figure 6:
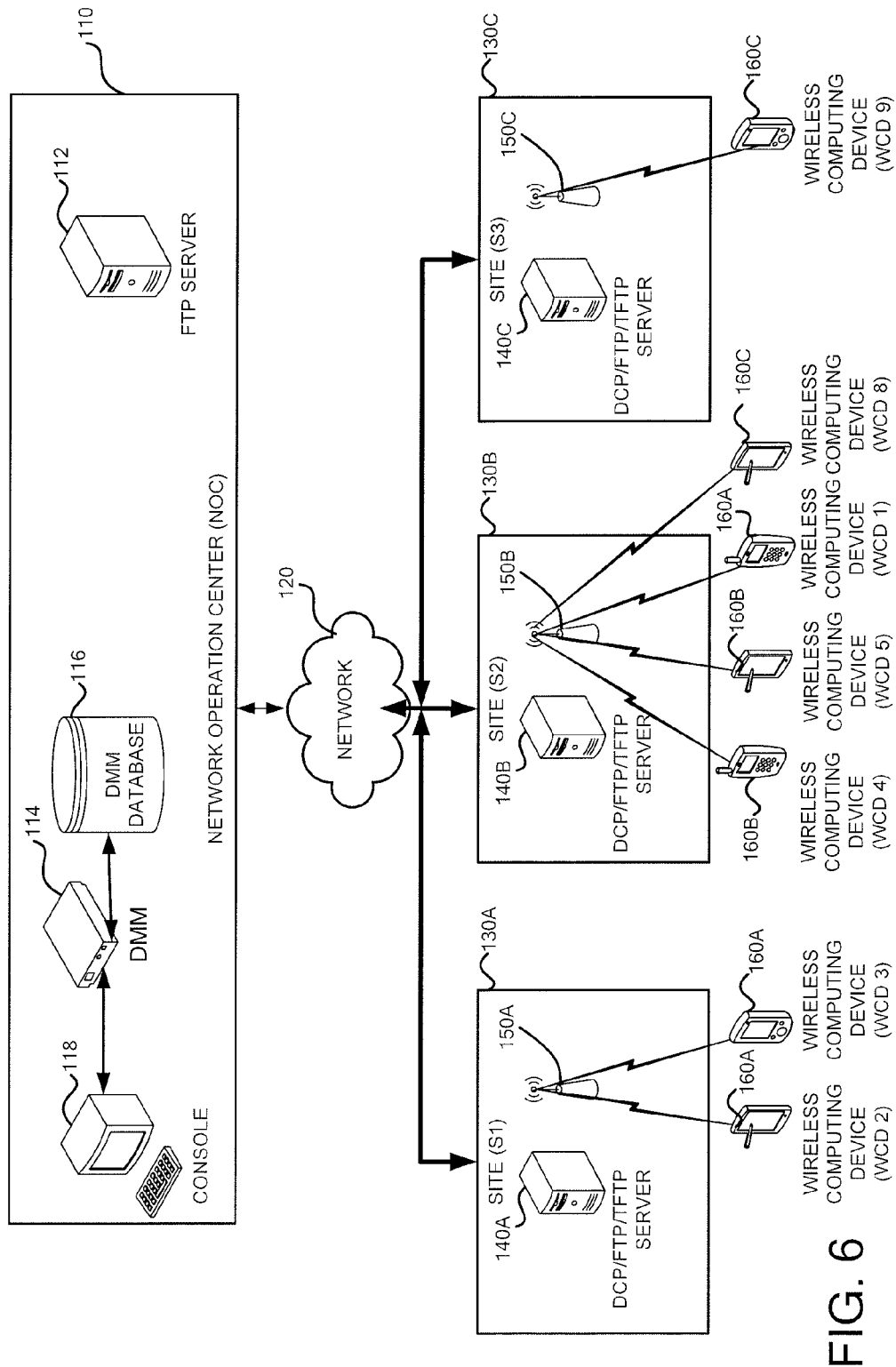
FIG. 6 is a block diagram illustrating the exemplary enterprise communication network of FIG. 1 at a second time when some of the wireless computing devices have moved or "roamed" from one logical site to another logical site.

FIG. 6 is a block diagram illustrating the exemplary enterprise communication network 100 at a second time when some of the wireless computing devices have moved or "roamed" from one logical site to another logical site. Specifically, FIG. 6 illustrates the exemplary enterprise communication network 100 at a second time when the wireless computing devices WCD1 160A and WCD8 160C have moved or "roamed" from logical sites 130A, 130C to logical site 130B, and wireless computing devices WCD6 160B and WCD7 160C have moved or roamed outside the coverage area of any logical site in the network 100.

To illustrate how the DMM 114 operates to provision software to the wireless computing devices 160A-C, a description will now be provided with reference to FIG. 4 in which the DMM 114 provides software packages to wireless computing devices WCD5 160B, WCD8 160C when they are associated with and registered at logical site 130B which includes a DCP server 140B and an access point 150B. However, it will be appreciated that the same techniques can be applied to provide software packages to any number of wireless computing devices located at any number of logical sites within a network.

Figure 7:
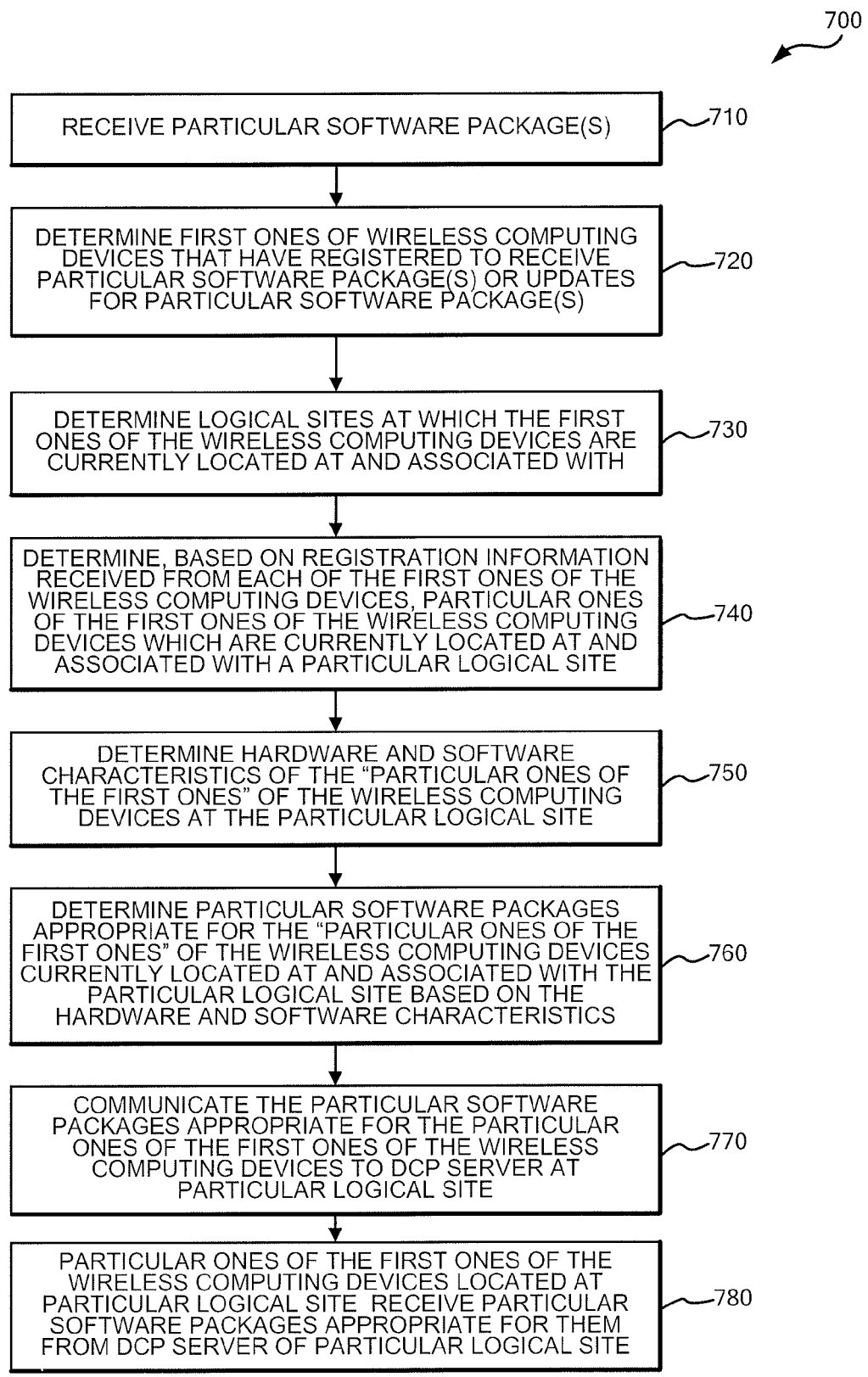
FIG. 7 is a flowchart illustrating an exemplary method for delivering software to wireless computing devices in an enterprise network in accordance with some embodiments of the present invention.

FIG. 7 is a flow chart is a flowchart illustrating an exemplary method 700 for delivering software to wireless computing devices in an enterprise network 100 in accordance with some embodiments of the present invention.

At step 710, the DMM 114 receives a particular software package or packages from console 118, and loads the software packages into the DMM database 116.

As noted above, the device management module (DMM) 114 registers each of the wireless computing devices to operate within the logical sites at which they are registered. For instance, in the following example, the device management module (DMM) 114 registers each of the particular ones of the wireless computing devices to operate within the first logical site 130B. At step 720, the DMM 114 determines first ones of the wireless computing devices that have registered to receive the particular software package or updates for the particular software package. To illustrate how the processing logic at the DMM 114 works in one embodiment, an exemplary scenario will be described where WCD2 160A, WCD5 160B, and WCD8 160C (i.e., first ones of the wireless computing devices) have registered to receive a software package A (not shown) or updates for software package A.

At step 730, the DMM 114 determines the logical sites 130A-C at which WCD2 160A, WCD5 160B, and WCD8 160C (i.e., the first ones of the wireless computing devices) are currently located at and associated with. In the exemplary scenario, it is assumed that WCD2 160A, WCD5 160B, and WCD8 160C (i.e., first ones of the wireless computing devices) are located at the logical sites shown in FIG. 2. In this exemplary scenario, DMM 114 determines that WCD2 and WCD 3 are still located at logical site 130A, while WCD4, WCD5, WCD1 and WCD8 are currently located at logical site 130B, and WCD9 is currently located at logical site 130C. In other words, in contrast to FIG. 1, in FIG. 2, WCD1 160A and WCD8 160C have roamed to logical site 130B, and WCD6 160B and WCD7 160C have roamed out of the network. As such, in the exemplary scenario shown in FIG. 2, the DMM 114 determines that WCD2 160A (i.e., one of the first ones of the wireless computing devices) is currently located at and associated with logical site 130A, that WCD5 160B and WCD8 160C (i.e., the other ones of the first ones of the wireless computing devices) are currently located at and associated with logical site 130B, and that none of the "first ones of" the wireless computing devices are currently located at and associated with logical site 130C.

At step 740, based on registration information received from each of the first ones of the wireless computing devices WCD2 160A, WCD5 160B, and WCD8 160C, the DMM 114 determines that the particular ones of the first ones of the wireless computing devices WCD5 160B and WCD8 160C are currently located at and associated with logical site 130B.

At step 750, the DMM 114 determines characteristics of the "particular ones of the first ones" of the wireless computing devices WCD5 160B, WCD8 160C before sending software package(s) to the first logical site 130B. For example, the DMM 114 considers the characteristics (both hardware and software) described above with reference to DMM database 116. For purposes of simplicity, these characteristics will not be described here again. Similarly, DMM 114 determines characteristics of the other wireless computing devices located at other logical sites.

At step 760, the DMM 114 determines particular software packages appropriate for the "particular ones of the first ones" of the wireless computing devices WCD5 160B, WCD8 160C based on the characteristics (described above) of the "particular ones of the first ones" of the wireless computing devices WCD5 160B, WCD8 160C currently located at and associated with the first logical site 130B. For example, in some embodiments, the device management module (DMM) 114 can determine particular software packages that the wireless computing devices WCD5 160B, WCD8 160C require based on registration information provided by the wireless computing devices WCD5 160B, WCD8 160C when the wireless computing devices WCD 5 160B, WCD 8 160C registered with the first logical site 130B by checking the version the WCD is running against the most current version, and automatically sending updates if the version the WCD is running is outdated. The device management module (DMM) 114 can then determine an appropriate version of the particular software packages to send to the first DCP server 140B based on the characteristics of the wireless computing devices WCD5 160B, WCD8 160C, and then compile a list of appropriate versions of the particular software packages to be sent to the first DCP server 140B at the first logical site 130B. The appropriate version of the particular software packages comprise device-specific software packages appropriate for the particular ones of the first ones of the wireless computing devices WCD 5, 160B, WCD 8 160C that are currently located at and associated with the first logical site 130B. In addition, DMM 114 determines particular software packages appropriate for the other wireless computing devices located at other logical sites.

At step 770, the DMM communicates the particular software packages appropriate for the "particular ones of the first ones" of the wireless computing devices WCD5 160B, WCD8 160C to DCP server 112, and DCP server 112 sends or "pushes" the particular software packages to DCP server 140B. For example, the DCP server 112 sends or pushes only the particular software packages in the list of appropriate versions of the particular software packages to the first DCP server 140B at the first logical site 130B. Notably, the DCP server 112 sends or pushes only one copy of each particular software package to the first DCP server 140B at the first logical site 130B. Similarly, DMM 114 communicates other software packages appropriate for the other wireless computing devices located at other logical sites. Thus, since the device management module (DMM) 114 knows all the devices which are present at a particular site and characteristics of those devices, the device management module (DMM) 114 will send or push only the required software packages to the particular site based on the wireless computing devices attached to that particular site.

At step 780, the wireless computing devices WCD5 160B, WCD8 160C located at logical site 140B can retrieve or pull particular software packages appropriate for them from the DCP server 140B of the first logical site 130B by communicating with the infrastructure device 150B. For example, in one embodiment, the wireless computing devices WCD5 160B, WCD8 160C can establish a connection to the DCP server 140B via the infrastructure device 150B, and then send a request to the DCP server 140B, via the infrastructure device, for the particular software packages. In response to these requests, the DCP server 140B sends the particular software packages to the wireless computing devices WCD5 160B, WCD8 160C. Similarly, the other wireless computing devices located at other logical sites can retrieve or pull particular software packages appropriate for them from the other DCP servers 140A, 140C located at other logical sites 130A, 130C by communicating with the infrastructure devices 150A, 150C at those logical sites 130A, 130C. Alternatively, in other embodiments, the DCP server 140B can send or "push" the particular software packages to the wireless computing devices WCD5 160B, WCD8 160C via the infrastructure device 150B. As such, even when a particular wireless computing device, such as WCD8 160C, roams from one logical site 130C to another logical site 130B, the device management module (DMM) 114 can direct wireless computing device WCD8 160C to pick up software packages from its current site 130B rather than its assigned (registered) site 130C since the device management module (DMM) 114 tracks movement of the wireless computing device WCD8 160C throughout the network 100.

Figure 8:
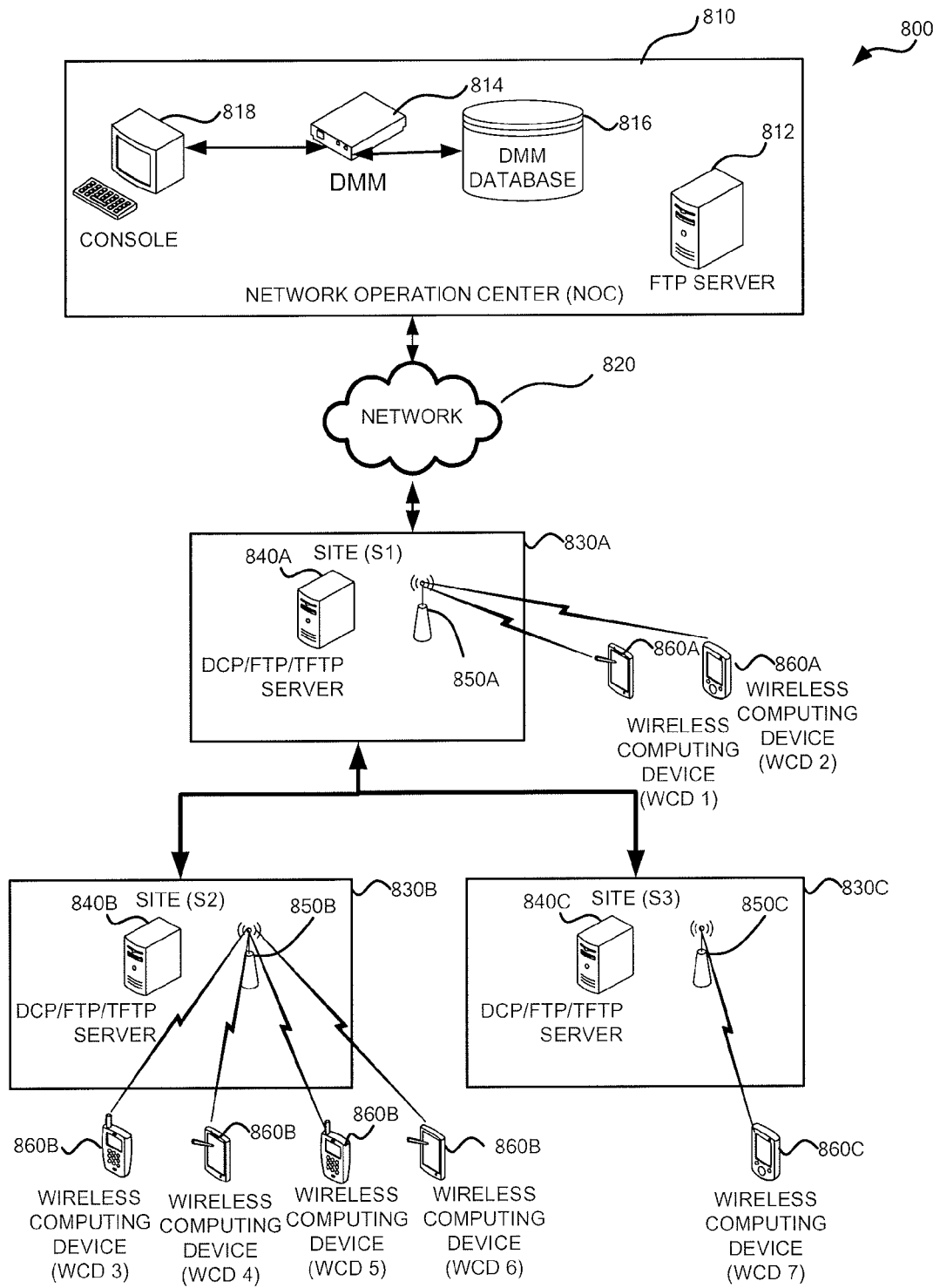
FIG. 8 is a block diagram illustrating the exemplary enterprise communication network in which logical sites are arranged in a hierarchical fashion.

FIG. 8 is a block diagram illustrating the exemplary enterprise communication network 800 in which logical sites 830A-C are arranged in a hierarchical fashion. In some embodiments such as that shown in FIG. 8, if logical sites 830A-C are arranged in a hierarchical fashion, then software packages can be moved from the NOC 810 to regional sites 830A and then from regional sites 830A to local sites 830B, C as needed.

In the disclosed embodiments, software packages are provisioned to wireless computing devices from a DCP server located at a logical site and/or physical site the wireless computing devices are currently located at and associated with.

A device management module (DMM) in a Network Operation Center (NOC) tracks movement of each wireless computing device, and before sending any software packages to a particular site, the device management module (DMM) detects the particular wireless computing device(s) currently located at the particular site. The device management module (DMM) sends appropriate "device specific" software packages to the DCP server located at the wireless computing device's current logical site and/or physical site. The device management module (DMM) sends or "pushes" only the appropriate or required software packages to the DCP server at a particular site based on the particular wireless computing devices present or currently located at the particular site. This helps a network administrator ensure that all wireless computing devices of a same type and a same model at a particular site are consistently running the same software packages. Moreover, when a particular wireless computing device roams from one site to another, the device management module (DMM) can direct that particular wireless computing device to pick up software packages from its current site rather than its assigned (registered) site since the device management module (DMM) tracks device movement throughout the network. Even when the location of a device changes when the device roams to a new logical site, because the DMM tracks the location of the roamed device, the software running on the roamed device can be kept up to date by using the local site for provisioning.

In addition, the device management module (DMM) in the NOC pushes one copy of each required software package (per device type) to a particular site. Since the device management module (DMM) knows all the devices which are present at a particular site, the device management module (DMM) pushes only the required packages to the particular site based on the wireless computing devices attached to that site. Many wireless computing devices (of a certain type or model) can then pull the software packages from local site rather than from NOC. Since many devices of same type can share the same software packages, less disk space is consumed at the site. In addition, less bandwidth is used since devices connect to their local or "current" DCP server to upgrade their software packages which is faster than using a slow link (e.g., dial-up modem) to the NOC. Since all the devices do not use the dial-up modem, the dial-up modem bandwidth is available for customer business transactions. This also reduces the bandwidth required between NOC and site for management operations by reducing overhead of network communication between NOC and site.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method executed by a device management module (DMM) server is provided for delivering at least one available software package to particular ones of a plurality of wireless computing devices located at a first logical site, the method comprising the steps of:
    receiving a particular software package at the device management module (DMM) server;
    receiving registration information at the device management module (DMM) server from each of the plurality of wireless computing devices, wherein the registration information for each of the wireless computing devices comprises: information identifying each of the plurality of wireless computing devices, and information identifying a logical site at which each of the wireless computing devices are currently located;
    determining first ones of the wireless computing devices that have registered to receive the particular software package;
    tracking a current location of each of the plurality of wireless computing devices;
    determining particular ones of the logical sites the first ones of the wireless computing devices are currently located at and associated with;
    determining particular ones of the first ones of the wireless computing devices that are currently located at and associated with the first logical site based on registration information for each of the first ones of the wireless computing devices;
    determining characteristics of the particular ones of the first ones of the wireless computing devices currently located at and associated with the first logical site before sending any software packages to the first logical site;
    determining particular software packages appropriate for the particular ones of the first ones of the wireless computing devices based on the characteristics of the particular ones of the first ones of the wireless computing devices currently located at and associated with the first logical site;
    sending the particular software packages to a first direct connection protocol (DCP) server located at the first logical site; and
    pushing the particular software packages to the particular ones of the first ones of the wireless computing devices with the first DCP server.

2. A method according to claim 1, further comprising the step of:
    storing characteristics associated with each of the wireless computing devices on a per logical site basis; and
    storing information regarding each of the available software packages, wherein the information regarding each of the available software package comprises metadata, wherein the metadata comprises:
        a software package identifier,
        information regarding operating systems supported by the software package, and
        information regarding hardware supported by the software package.

3. A method according to claim 1, further comprising:
    registering each of the particular ones of the wireless computing devices to operate within the first logical site.

4. A method according to claim 1, wherein the registration information for each of the plurality of wireless computing devices further comprises:
    software characteristics associated with the wireless computing device;
    hardware characteristics associated with the wireless computing device.

5. A method according to claim 4, wherein the software characteristics for each wireless computing device comprise:
    operating system of the wireless computing device and operating system version number of the operating system; and
    software packages each of the wireless computing devices wants to receive updates for and the version number of the software packages, and wherein the hardware characteristics for each wireless computing device comprise:
    device name,
    device type,
    device model number,
    device unit identifier, and
    device CPU type.

6. A method according to claim 4, wherein the step of determining particular software packages appropriate for the particular ones of the first ones of the wireless computing devices based on the characteristics of the particular ones of the first ones of the wireless computing devices currently located at and associated with the first logical site, further comprises:
    determining particular software packages required by the particular ones of the first ones of the wireless computing devices currently located at and associated with the first logical site based on registration information received from the particular ones of the first ones of the wireless computing devices;
    determining an appropriate version of the particular software packages to send to the first DCP server based on the characteristics of the particular ones of the first ones of the wireless computing devices; and
    compiling a list of appropriate versions of the particular software packages to be sent to the first DCP server at the first logical site.

7. A method according to claim 6, wherein the appropriate version of the particular software packages comprise:
    device-specific software packages appropriate for the particular ones of the first ones of the wireless computing devices currently located at and associated with the first logical site.

8. A method according to claim 6, wherein the step of sending the particular software packages to the first DCP server further comprises:

sending only one copy of each of the particular software packages in the list of appropriate versions of the particular software packages to the first DCP server at the first logical site.

9. A method according to claim 1, further comprising:
retrieving, at the particular ones of the first ones of the wireless computing devices, the particular software packages from the first DCP server of the first logical site by communicating with an infrastructure device at the logical site.

10. A method according to claim 9, wherein the step of retrieving further comprises:
establishing a connection from the particular ones of the first ones of the wireless computing devices to the first DCP server via the infrastructure device;
sending a request, via the infrastructure device, to the first DCP server for a particular one of the particular software packages; and
receiving the particular one of the particular software packages from the first DCP server to the particular ones of the first ones of the wireless computing devices requesting the particular one of the particular software packages.

11. A system comprising:
a plurality of logical sites, wherein the plurality of logical sites comprise a first logical site which comprises: a first direct connection protocol (DCP) server;
a plurality of wireless computing devices; and
a Network Operation Center (NOC) communicatively coupled to the plurality of logical sites by a network, wherein the NOC comprises:
a device management module (DMM) designed to receive a particular software package, and to receive registration information from each of the wireless computing devices in the system, wherein the registration information for each of the wireless computing devices comprises: information identifying each of the wireless computing devices, and information identifying the logical site at which each of the wireless computing devices are currently located, wherein the DMM comprises:
a first module designed to determine first ones of the wireless computing devices that have registered to receive the particular software package;
a second module designed to track a current location of the wireless computing devices;
a third module designed to determine particular ones of the logical sites the first ones of the wireless computing devices are currently located at and associated with;
a fourth module designed to determine particular ones of the first ones of the wireless computing devices that are currently located at and associated with the first logical site based on registration information for each of the first ones of the wireless computing devices;
a fifth module designed to determine characteristics of the particular ones of the first ones of the wireless computing devices currently located at and associated with the first logical site before sending any software packages to the first logical site;
a sixth module designed to determine particular software packages appropriate for the particular ones of the first ones of the wireless computing devices based on the characteristics of the particular ones of the first ones of the wireless computing devices currently located at and associated with the first logical site; and a second DCP server designed to send the particular software packages to the first DCP server, wherein the particular software packages are pushed to the particular ones of the first ones of the wireless computing devices by the first DCP server.

12. A system according to claim 11, wherein the network operations center (NOC) further comprises:
a database designed to:
store characteristics associated with each of the wireless computing devices on
a per logical site basis; and
store information regarding each of the available software packages, wherein the information regarding each of the available software package comprises metadata, wherein the metadata comprises:
a software package identifier,
information regarding operating systems supported by the software package, and
information regarding hardware supported by the software package.

13. A system according to claim 11, wherein the device management module (DMM) is further designed to:
register each of the particular ones of the wireless computing devices to operate within the first logical site.

14. A system according to claim 11, wherein the registration information for each of the plurality of wireless computing devices further comprises:
software characteristics associated with the wireless computing device; and
hardware characteristics associated with the wireless computing device.

15. A system according to claim 14, wherein the software characteristics for each wireless computing device comprise:
operating system of the wireless computing device and operating system version number of the operating system; and
software packages each of the wireless computing devices wants to receive updates for and the version number of the software packages, and
wherein the hardware characteristics for each wireless computing device comprise:
device name,
device type,
device model number,
device unit identifier, and
device CPU type.

16. A system according to claim 14, wherein the sixth module determines particular software packages appropriate for the particular ones of the first ones of the wireless computing devices based on the characteristics of the particular ones of the first ones of the wireless computing devices currently located at and associated with the first logical site by being designed to:
determine particular software packages required by the particular ones of the first ones of the wireless computing devices currently located at and associated with the first logical site based on registration information received from the particular ones of the first ones of the wireless computing devices;
determine an appropriate version of the particular software packages to send to the first DCP server based on the characteristics of the particular ones of the first ones of the wireless computing devices; and
compile a list of appropriate versions of the particular software packages to be sent to the first DCP server at the first logical site.

17. A system according to claim 16, wherein the appropriate version of the particular software packages comprise:
   device-specific software packages appropriate for the particular ones of the first ones of the wireless computing devices currently located at and associated with the first logical site.

18. A system according to claim 16, wherein the second DCP server is further designed to send the particular software packages to the first DCP server by being designed to:
   send each of the particular software packages in the list of appropriate versions of the particular software packages to the first DCP server at the first logical site.

19. A system according to claim 18, wherein the second DCP server is further designed to:
   send only one copy of each particular software package to the first DCP server at the first logical site.

20. A system according to claim 11, wherein the logical site further comprises:
   at least one infrastructure device,
   wherein the particular ones of the first ones of the wireless computing devices are designed to:
   retrieve the particular software packages from the first DCP server of the first logical site by communicating with the infrastructure device.

21. A system according to claim 20, wherein each of the particular ones of the first ones of the wireless computing devices are designed to retrieve the particular software packages from the first DCP server of the first logical site by being designed to:
   establish a connection to the first DCP server via the infrastructure device;
   send a request, via the infrastructure device, to the first DCP server for a particular one of the particular software packages; and
   receive the particular one of the particular software packages from the first DCP server at some of the particular ones of the first ones of the wireless computing devices requesting the particular one of the particular software packages.

22. A non-transitory computer-readable medium having computer-executable instructions for performing steps comprising:
   receiving a particular software package;
   receiving registration information from each of a plurality of wireless computing devices in a system, wherein the registration information for each of the wireless computing devices comprises: information identifying each of the wireless computing devices, and information identifying a logical site at which each of the wireless computing devices are currently located;
   determining first ones of the wireless computing devices that have registered to receive the particular software package;
   tracking a current location of the wireless computing devices;
   determining particular ones of logical sites the first ones of the wireless computing devices are currently located at and associated with;
   determining particular ones of the first ones of the wireless computing devices that are currently located at and associated with a first logical site based on registration information for each of the first ones of the wireless computing devices;
   determining characteristics of the particular ones of the first ones of the wireless computing devices currently located at and associated with the first logical site before sending any software packages to the first logical site;
   determining particular software packages appropriate for the particular ones of the first ones of the wireless computing devices based on the characteristics of the particular ones of the first ones of the wireless computing devices currently located at and associated with the first logical site;
   sending the particular software packages to a first direct connection protocol (DCP) server at the first logical site and
   pushing the particular software packages to the particular ones of the first ones of the wireless computing devices with the first DCP server.

* * * * *

UNITED STATES PATENT AND TRADEMARK OFFICE
CERTIFICATE OF CORRECTION

PATENT NO. : 8,060,874 B2  
APPLICATION NO. : 11/668152  
DATED : November 15, 2011  
INVENTOR(S) : Rengarajan et al.

Page 1 of 1

It is certified that error appears in the above-identified patent and that said Letters Patent is hereby corrected as shown below:

Title Page, Item (56), under "OTHER PUBLICATIONS", in Column 2, Line 2, delete "[retrived" and insert -- [retrieved --, therefor.

Title Page, Item (56), under "OTHER PUBLICATIONS", in Column 2, Line 3, delete "retrived from" and insert -- retrieved from --, therefor.

Title Page 2, Item (56), under "OTHER PUBLICATIONS", in Column 1, Line 3, delete "retrived from" and insert -- retrieved from --, therefor.

Title Page 2, Item (56), under "OTHER PUBLICATIONS", in Column 1, Line 7, delete "retreved from" and insert -- retrieved from --, therefor.

Title Page 2, Item (56), under "OTHER PUBLICATIONS", in Column 2, Line 5, delete "[retrived" and insert -- [retrieved --, therefor.

Title Page 2, Item (56), under "OTHER PUBLICATIONS", in Column 2, Line 6, delete "retrived from" and insert -- retrieved from --, therefor.

In Column 16, Line 35, in Claim 22, delete "site" and insert -- site; --, therefor.

Signed and Sealed this
Twenty-fifth Day of December, 2012

David J. Kappos
*Director of the United States Patent and Trademark Office*